J. H. COFFMAN.
AUTOMOBILE COWL ATTACHMENT.
APPLICATION FILED MAR. 25, 1919.
1,349,715.
Patented Aug. 17, 1920.
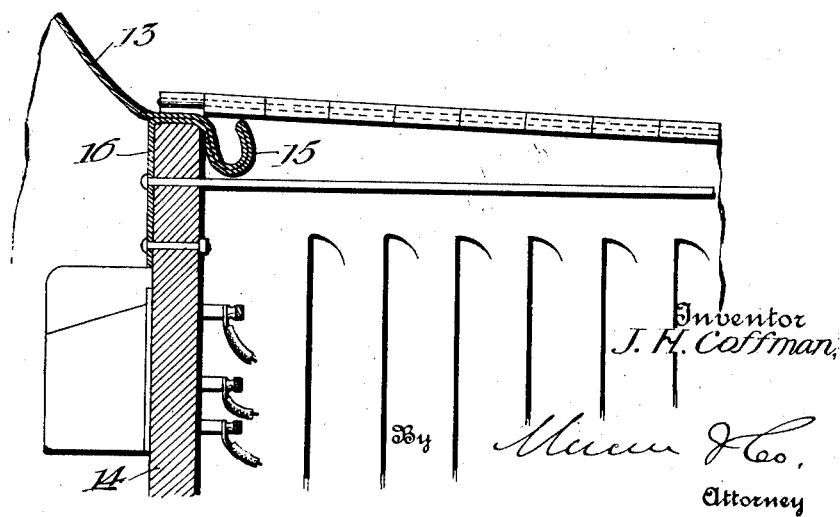

UNITED STATES PATENT OFFICE.

JOSEPH H. COFFMAN, OF AMERICUS, GEORGIA.

AUTOMOBILE-COWL ATTACHMENT.

1,349,715.  Specification of Letters Patent.  Patented Aug. 17, 1920.

Application filed March 25, 1919. Serial No. 284,909.

*To all whom it may concern:*

Be it known that I, JOSEPH H. COFFMAN, a citizen of the United States, and a resident of Americus, in the county of Sumter and State of Georgia, have invented certain new and useful Improvements in Automobile-Cowl Attachments, of which the following is a specification.

My invention relates to the bodies of automobiles and has for its object the provision of a cowl construction whereby to provide a gutter located beneath the juncture of the hood with the cowl whereby to prevent water from dropping down onto the coil box terminals and ignition wires connected therewith.

In the drawings:—

The figure shows a longitudinal sectional view through a portion of the cowl and dash of an automobile and showing the position of the hood, the cowl being constructed in accordance with my invention.

In ordinary constructions the cowl 5 of the automobile comes forward, inclining downwardly, toward the rear face of the dash, and laps upon the said rear face and is secured thereto. The invention is designed primarily for use upon Ford automobiles of the latest type and it is well known that water passing from the cowl to the hood passes over the top of the dash and drops onto the coil box terminals and the ignition wires and results in short circuiting of the ignition circuit. It is with this great objection or disadvantage in view that the invention has been designed.

Referring more particularly to the drawing, the numeral 13 designates the cowl and 14 designates the dash of the vehicle. In the ordinary construction the lower end of the cowl is bent into contact with the rear side of the dash and secured thereto by suitable fasteners. In carrying out my invention the cowl 13 has its lower edge formed longer than the present cowl and is bent to provide a gutter 15 which is disposed adjacent the forward side of the dash, that is the side toward the engine. The material of the cowl is rebent upon itself, as clearly shown, resulting in providing a gutter having a double thickness whereby its strength will be increased and rigidity will be attained. The cowl of course is disposed upon the top edge of the dash and the end portion after being bent and rebent to form the gutter is disposed against the rear side of the dash and secured thereto as by the present means.

In the use of the device it will be seen that the trough, which should be curved longitudinally, serves to catch the water which leaks between the cowl and the hood and carries the same to the sides of the hood so that the water cannot drop onto the coil box terminals and the wires associated therewith.

I claim:—

In automobile body construction, the combination with the cowl, of a gutter formed integrally upon the cowl by bending the same upon itself to provide a portion engaging upon the top edge of the dash, and a gutter member located adjacent the front face of the dash in position to receive water leaking between the cowl and the hood, and the end portion of the cowl being again bent to lie flat against and be secured to the rear face of the dash.

JOSEPH H. COFFMAN.

Witnesses:
 G. R. ELLIS,
 C. B. MOORE.